Nov. 29, 1932.  C. E. REED  1,889,216
EARTH BORING TOOL
Filed Dec. 3, 1928   2 Sheets-Sheet 1

Inventor:
Clarence E. Reed,
by Spear Middleton, Donaldson & Hall
Attys.

Nov. 29, 1932.  C. E. REED  1,889,216
EARTH BORING TOOL
Filed Dec. 3, 1928   2 Sheets-Sheet 2

Inventor:
Clarence E. Reed,
by Spear, Middleton, Donaldson & Hall
Attys.

Patented Nov. 29, 1932

1,889,216

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

EARTH BORING TOOL

Application filed December 3, 1928. Serial No. 323,273.

The invention relates to apparatus used in connection with earth boring for making deep wells and concerns a tool involving a chuck for holding implements or members employed in carrying out the work.

In carrying out the invention I provide a chuck combined with a holder therefor, which latter is adapted to receive the chuck removably, said holder preferably being adapted to receive cutting units so that the same head or holder may be used either in carrying the cutting units directly, or through the medium of a chuck. A different form of cutter or other tool thus may be substituted for the said directly supported cutting units.

The invention consists in the features and combination and arrangement of parts hereinafter described and particularly pointed out in the claims.

Figure 1:
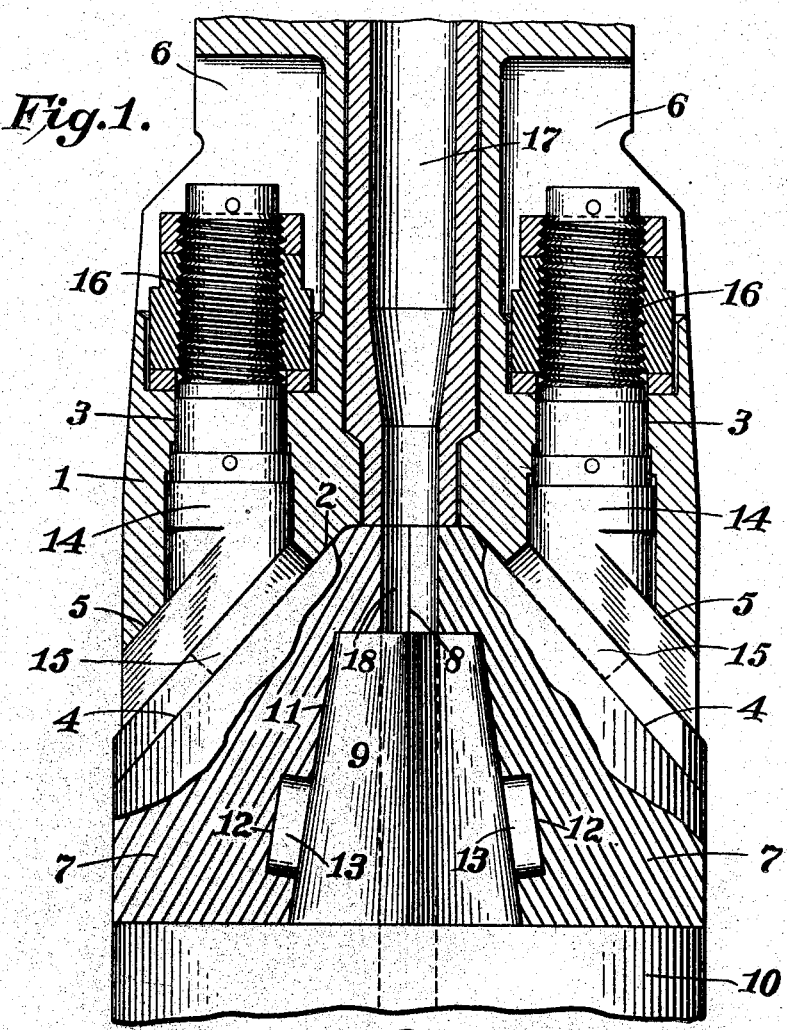
Figure 1 is a sectional view of a bit head or holder with the chuck mounted therein.
Figure 2:
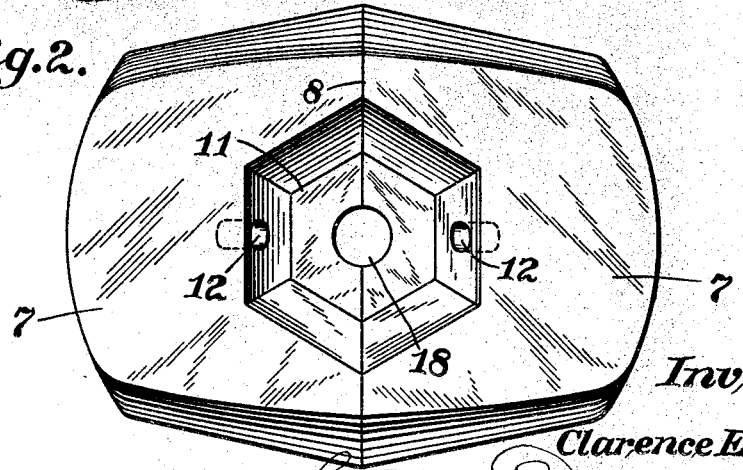
Fig. 2 is a bottom plan view of the chuck.
Figure 3:
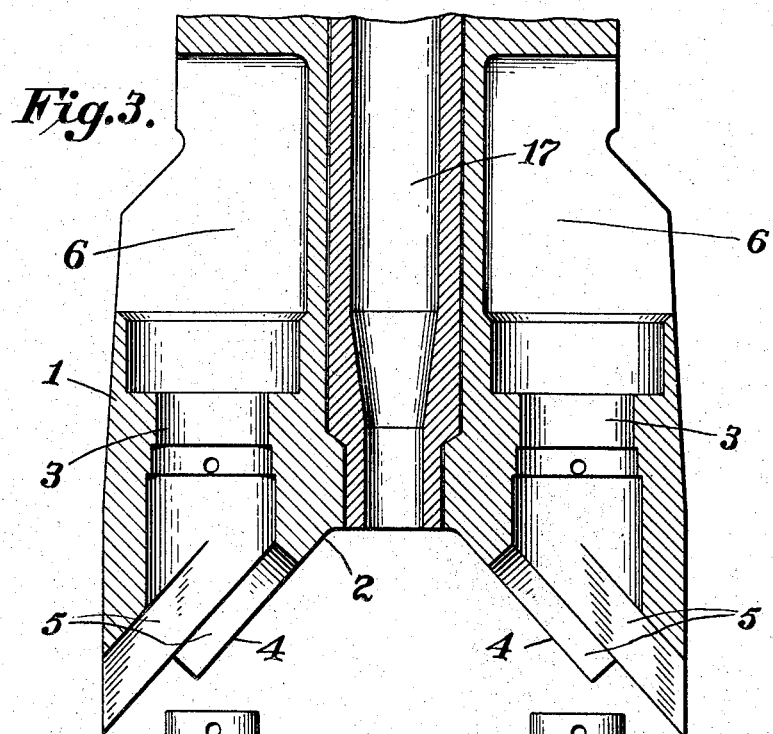
Fig. 3 is a view similar to Fig. 1 of the head.
Figure 4:
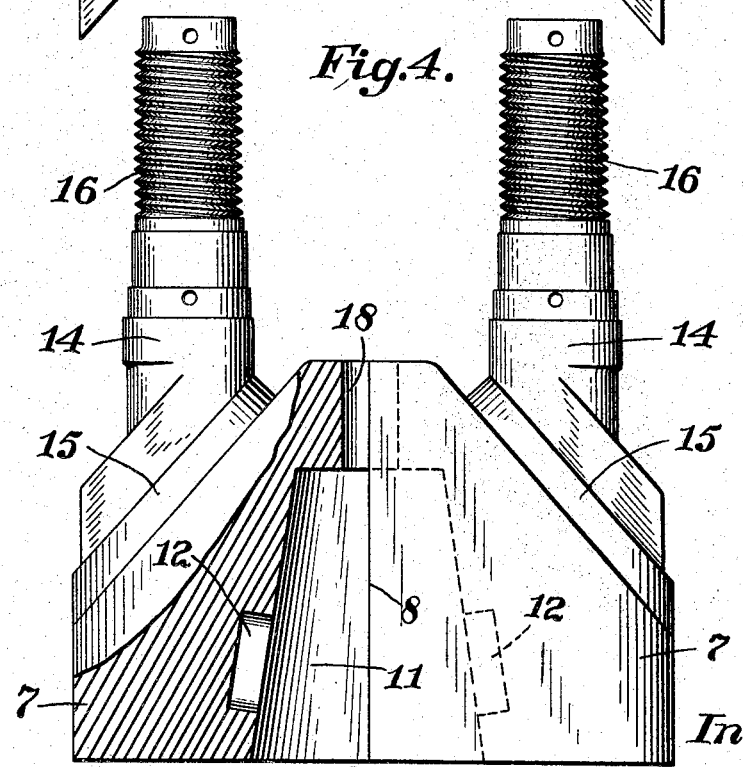
Fig. 4 is a view of the chuck assembly ready for insertion into the head.

In these drawings 1 indicates a one piece bit head such as shown in Letters Patent of the United States granted to me July 19, 1927, Nos. 1,636,665-6-7-8. This bit head has an inverted V-shaped recess 2 at its lower end. Extending vertically of the bit head, parallel with the vertical axis thereof, are sockets 3, two in number, and at equal distances from and on opposite sides of the vertical axis of the bit head. These sockets extend from the inclined walls 4 of the V-shaped recess, which walls diverge downwardly and outwardly from the vertical axis of the bit head. These inclined walls have seat recesses 5 formed therein, about the openings of the sockets. These sockets and seat recesses are adapted to receive parts of the cutter units when the bit head is used, as in the patents referred to above, as a support or carrier for rotary cutter units. These units, as in said patents, comprise each a shank adapted to fit into the socket, with a flange or base to fit the seat recess and a spindle connected integrally with said flange and shank, said spindle extending at a right angle to the inclined wall into the inverted V-shaped recess, so as to extend downwardly and inwardly towards the vertical axis of the head and in convergent relation to each other. These spindles carry the rotary toothed cutters. The units are inserted into place by moving them vertically parallel with the vertical axis of the drill. When in place the cutter units are held by nuts or screw collars engaging the upper threaded ends of the shanks of the unit, which project into laterally open recesses 6 into which the nuts are inserted.

It is sometimes desirable to use a different form of tool or cutter unit instead of the rotary toothed cutters, such for instance, as a fish tail cutter or bit, or to use a fishing tool, and in order to avoid the necessity of having an entirely separate outfit involving a head or holder for this different form of tool, I have provided a chuck adapted to be mounted in the bit head above described, so that this head may be used either with rotary toothed cutters or with other forms of tools. This chuck comprises two members 7 forming, when assembled, a body split at 8 along the vertical axis of the bit head. Each of these members has part of the formation adapted to receive the shank 9 of a tool 10, which we will assume is a flat cutter blade, or like a fish tail cutter or bit. This formation may consist of a socket 11 having recesses 12 connected therewith to receive projection 13 on the shank 9 of the fish tail cutter or other tool. Each member 7 has a shank 41 formed like the shank of the cutter unit above described and adapted to go into one of the sockets 3 in the bit head. These shanks, like those above described, are provided with flanges 15 adapted to fit in the seat recesses of the inclined walls of the inverted V-shaped recess at the bottom of the bit head. These chuck shanks are also threaded at their upper ends at 16 like the shanks of the rotary cutter units that are adapted to go into the sockets, and like the cutter units, the chuck units are held by nuts introduced into the laterally open recesses and engaging the screw threads at 16.

The formation at the meeting faces of the chuck jaws or members may be of any desired form so as to hold the shank of the fish tail bit or other tool which it is desired to use in the bit head. This formation may be a socket angular in cross section, as shown in the bottom plan view, and as shown in Fig. 1, the socket formed between the halves of the chuck may have the recesses 12 adapted to receive projections on the shank of the fish tail bit. In the use of the apparatus, supposing it is desired to substitute for the rotary toothed cutters shown in my said patent a fish tail bit, so as to turn with the bit head, the rotary cutter units are removed from the bit head and an assembled chuck with the shank of the fish tail bit held between the sections or halves thereof are moved as one body parallel with the longitudinal axis of the bit head, so that both of the shanks will enter the sockets 3, 3 at the same time, and then by continuing this inserting movement, the shanks will be seated and the flanges 15 will enter the seat recesses in the inclined walls of the inverted V-shaped recess, and then the shanks are secured by the nuts as above mentioned.

The members constituting the halves of the chuck, when assembled and inserted as just described, will substantially fill the inverted V-shaped recess at the bottom of the bit head and will be sustained by these walls against displacement. It will be understood that with a cutting tool such as a fish tail bit held by the chuck, rotary motion of the bit head about its axis will cause the cutting tool to rotate also in doing the cutting. Other forms of tools or appliances may be held by the chuck.

The bit head has a channel 17 for the flow of flushing fluid and the chuck has a like channel 18 to register with the channel 17 for the flow of said fluid to the bottom of the well.

I claim:

1. In combination with a bit head having an inverted V-shaped recess at its lower end with a socket disposed at each side of said recess parallel with the vertical axis of the head and opening through the downwardly and outwardly inclined walls defining said recess, a chuck for carrying a tool, said chuck fitting in said inverted V-shaped recess and having a pair of shanks to fit the said sockets and means for holding the shanks in said sockets, substantially as described.

2. Apparatus according to claim 1 in which the chuck is formed in two jaws divided from each other substantially in line with the vertical axis of the bit head, each jaw having one of the shanks and also having in its face a formation to hold the shank of a tool, to be operated by said bit head.

3. In earth boring apparatus, in combination with a head having a recess at its lower end and sockets parallel with the axis of the head opening into said recess, of a two-part chuck insertable axially of said head into said recess, and means on each of said parts for securing the same to said head comprising an extension engaging one of said sockets.

4. The combination with a head having sockets at one end parallel with its vertical axis of a two-part chuck for carrying a tool when assembled upon the latter, and means for securing said chuck to said head comprising an off-center shank on each of said parts to fit said head sockets.

5. The combination with a head having a recess at its lower end and sockets parallel with its vertical axis opening into said recess, of a two-part chuck for carrying a tool when assembled upon the latter, each chuck part having a portion fitting one side of said recess and an off-center shank to fit one of said sockets, and means for securing said shanks in said sockets.

6. A chuck part comprising a block cut away to provide half of a retaining socket for the shank of a working tool and having an off-center cylindrical projection or shank for securing the part to a drill head, two of said parts being used together to form an earth boring chuck.

7. A chuck part comprising a block providing on one side a portion of a retaining socket for the shank of a working tool and a portion of a passage for flushing fluid, said part having on its other side a cylindrical projection or shank for securing the same to a drill head.

8. A chuck part for earth boring apparatus comprising a block cut away to provide half of a retaining socket for the shank of a working tool and half of a passage for flushing fluid, said part having, diametrically opposite said cut-away portion, means for engaging and securing the part to a drill head, said means comprising a shank extending beyond said block and stop surfaces at the base of said shank, said stop surfaces being directed obliquely with respect to said shank.

In testimony whereof, I affix my signature.

CLARENCE E. REED.